(No Model.)
J. C. AUSTIN.
HAY UNLOADING AND STACKING APPARATUS.
No. 251,018. Patented Dec. 20, 1881.
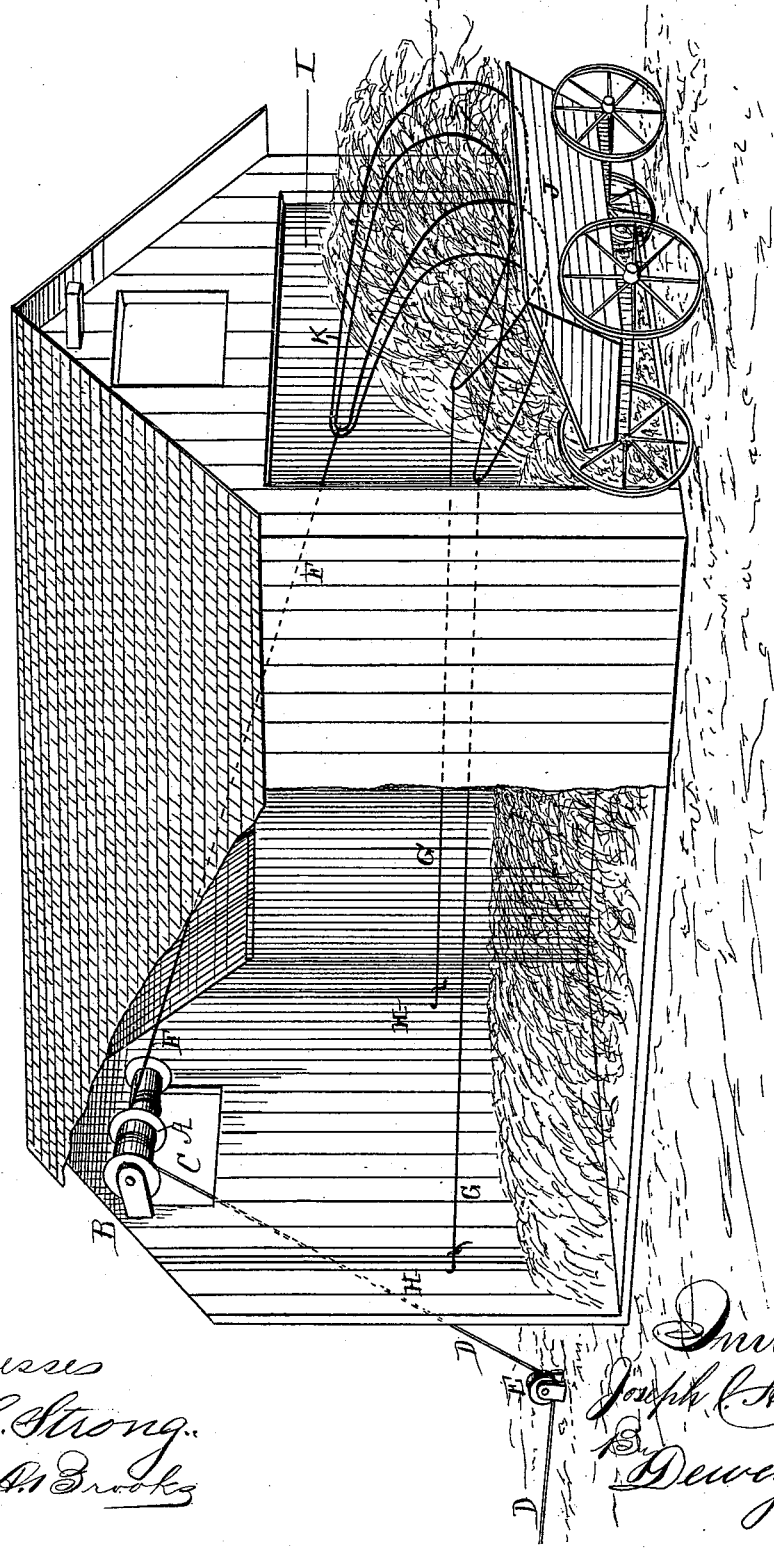

UNITED STATES PATENT OFFICE.

JOSEPH C. AUSTIN, OF IMUSDALE, CALIFORNIA.

HAY UNLOADING AND STACKING APPARATUS.

SPECIFICATION forming part of Letters Patent No. 251,018, dated December 20, 1881.

Application filed August 30, 1881. (No model.)

*To all whom it may concern:*

Be it known that I, JOSEPH C. AUSTIN, of Imusdale, Monterey county, State of California, have invented a Hay Unloading and Stacking Apparatus; and I do hereby declare the following to be a full, clear, and exact description thereof.

My invention relates to certain improvements in that class of apparatus by which hay or similar substances may be removed from a wagon to a barn or stack; and it consists in certain details of construction by which loads of hay may be removed from the wagon, carried the whole length of the barn, and finally deposited at the opposite end of the barn from the wagon at a single operation. Each successive load is transferred to the top of the preceding one until the end of the barn is full. The next section is then filled in the same manner, and so on in succession until the whole barn has been filled from the single entrance at one end.

Referring to the accompanying drawings for a more complete explanation of my invention, the figure is a perspective view of a barn with a portion broken away, showing the windlass-ropes, unloading-net, and wagon.

When rolling nets have been employed to unload and house hay or grain it has been necessary to drive the wagon close to the barn and to employ a derrick or other device with supplemental nets, tightening devices, &c., so as to elevate the hay to an opening in the roof at a considerable height, from whence it is dropped into the barn.

In my invention I fix a windlass, A, high up on one of the end walls of the barn B, inside. An opening, C, is made through this end wall near the windlass, and a rope, D, passing through this opening, has one end wound around the windlass, while the other end passes beneath a pulley, E, upon the ground outside, and leads from thence to the horse or other power, by which it is drawn out and the windlass revolved. Another rope, F, is secured to the other end of the windlass or driven so as to be wound upon it by the power and rotation produced by the rewinding of the rope D.

Two ropes, G G, are attached to the bottom of vertical posts H at the end of the barn, near the windlass, and these lead forward to the front end of the barn, where the entrance-door I is situated. The wagon J, containing the hay, is then driven up beside the door, ready to be unloaded. Before the hay is placed in the wagon the unloading or wagon net K is laid in the bed of the wagon in the usual manner and the hay loaded upon it or into it. When the wagon arrives at the barn the free end of the rope F is secured to the edge of the net K which is upon the side farthest from the barn. The ends of the ropes G G are attached to the side of the net nearest the barn, and at such points that they will extend nearly parallel from the posts H H across the floor to the net. The windlass B is then turned so as to wind up the rope F, and this draws the outer edge of the net K over the body of hay, and finally turns the hay out of the wagon upon the ropes G G. As the rope F is wound upon the windlass the body of hay is rolled over and over upon and by the ropes G, which also serve as tracks to guide it across the floor to the end of the barn, where it is finally left. The ropes are then released and carried to the front for another load, which is rolled upon the first deposit, in the manner before described, until the end of the barn is filled. The next section is then filled in the same manner until the whole barn has been filled, the work being entirely done without pitching or manual labor.

By my apparatus the hay can be transported the whole length of the barn from the wagon, and the ropes G G serve as tracks or guides to deliver it to the proper point.

I am aware that wagon-nets to receive hay have been connected with ropes leading to the top of a barn and other ropes leading to the top of a mast or derrick, so as to roll the hay upon the roof and discharge it through a door in said roof. I am also aware that a similar rolling net has been employed to stack hay or grain out of doors, and I do not claim, broadly, either of these devices; but,

Having thus described my invention, what I claim as new, and desire to secure by Letters Patent, is—

The apparatus for unloading, transporting, and depositing hay within a barn, consisting of the parallel floor-ropes G G, in combination with the windlass B, ropes D and F, and wagon-net K, all operating substantially as and for the purpose herein described.

In witness whereof I have hereunto set my hand.

JOSEPH C. AUSTIN.

Witnesses:
GEO. H. STRONG,
FRANK A. BROOKS.